US010429185B2

United States Patent
Tornqvist et al.

(10) Patent No.: US 10,429,185 B2
(45) Date of Patent: *Oct. 1, 2019

(54) INDOOR ROTATION SENSOR AND DIRECTIONAL SENSOR FOR DETERMINING THE HEADING ANGLE OF PORTABLE DEVICE

(71) Applicant: SenionLab AB, Linkoping (SE)

(72) Inventors: David Tornqvist, Linkoping (SE);
Fredrik Gustafsson, Linkoping (SE);
Per Skoglar, Linkoping (SE)

(73) Assignee: SENIONLAB AB, Linkoping (SE)

( * ) Notice: Subject to any disclaimer, the term of this patent is extended or adjusted under 35 U.S.C. 154(b) by 339 days.

This patent is subject to a terminal disclaimer.

(21) Appl. No.: 15/067,851

(22) Filed: Mar. 11, 2016

(65) Prior Publication Data
US 2017/0261320 A1     Sep. 14, 2017

(51) Int. Cl.
| G05D 13/00 | (2006.01) |
| G01C 17/28 | (2006.01) |
| G01C 19/00 | (2013.01) |
| G01P 15/14 | (2013.01) |

(52) U.S. Cl.
CPC ............ *G01C 17/28* (2013.01); *G01C 19/00* (2013.01); *G01P 15/14* (2013.01)

(58) Field of Classification Search
CPC ...... G01C 19/00; G01C 21/165; G01C 25/00; G01C 25/005; G01P 15/14; G01P 21/00; G01P 21/02; G05D 13/00; A63B 2220/40; H04M 1/72572
See application file for complete search history.

(56) References Cited

U.S. PATENT DOCUMENTS

| 8,676,528 | B2 * | 3/2014 | Almalki ................. G01C 17/28 702/96 |
| 8,934,884 | B2 * | 1/2015 | Gustafsson ....... H04W 52/0254 342/357.31 |
| 8,957,812 | B1 * | 2/2015 | Hill ........................ G01S 5/0027 342/445 |
| 9,020,752 | B2 * | 4/2015 | Lundquist ............ G01C 21/005 701/434 |
| 9,677,888 | B2 * | 6/2017 | Tornqvist ............... G01C 17/38 |

(Continued)

*Primary Examiner* — Lisa M Caputo
*Assistant Examiner* — Nigel H Plumb
(74) *Attorney, Agent, or Firm* — Miller, Matthias & Hull LLP

(57) ABSTRACT

A method and system are provided for determining a heading angle of a user of a portable electronic device in an indoor environment. In an embodiment, the device collects rotational movement information indicative of rotational movement of the device and determines a first heading angle of the device. The first heading angle is determined by using the downward direction of the device to determine the vertical angular rate in the horizontal plane, and integrating the vertical angular rate to form the first heading angle. The device collects first direction information from a first direction sensor and second direction information from a second direction sensor and uses it determine which of the first and second direction information is an outlier, e.g., inaccurate due to an occurrence of a disturbance. The device then corrects the heading angle by comparing the heading angle to the first and second direction information.

19 Claims, 7 Drawing Sheets

(56) References Cited

U.S. PATENT DOCUMENTS

| | | | |
|---|---|---|---|
| 2015/0153380 A1* | 6/2015 | Elhoushi | G01P 15/14 |
| | | | 702/141 |
| 2015/0312404 A1* | 10/2015 | Abramson | H04W 4/027 |
| | | | 455/418 |
| 2016/0025499 A1* | 1/2016 | Moore | G01C 21/165 |
| | | | 701/1 |

* cited by examiner

INDOOR ROTATION SENSOR AND DIRECTIONAL SENSOR FOR DETERMINING THE HEADING ANGLE OF PORTABLE DEVICE

TECHNICAL FIELD

The present disclosure is related generally to indoor navigation, and, more particularly, to a system and method for determining a heading (direction of motion) in an indoor positioning system.

BACKGROUND

Navigation and localization have always been important to mankind, and maps have been developed since the first systematic explorations started. Today, localization is in almost all applications performed by electronic systems, where global navigation satellite systems (GNSS) provide a robust, global and versatile solution for localization suitable for almost all outdoor applications. Navigation systems also involve determination of orientation and speed. Either separate sensors as electronic compass and speedometers can be used, or the positions from GNSS can be filtered to provide these additional features.

Indoor localization and navigation is a much harder task, but it is still an important application for many humans and autonomous systems moving around in complex indoor environments. The GNSS approach does not work due to the weak radio signals that are shielded and reflected by the building construction.

There are two main approaches available for indoor navigation based on different information sources:

1) Landmark based navigation, where the indoor landmarks with known position are deployed in the indoor environment, and the user is equipped with a map of these landmarks. The localization algorithm consists of triangulation and trilateration based on detection of one or more of these landmarks. This includes fingerprinting of radio signal strength indications (RSSI) from WiFi, cell phone base stations, Bluetooth Low Energy (BLE) or other radio beacons. The advantages of landmark based navigation include robust, potentially quite accurate, drift-free localization. To implement such an approach, simple localization algorithms can be utilized, e.g., filter methods are not needed but can be used to get smooth trajectories. However, landmark based navigation requires pre-installed infrastructure and tedious mapping. The approach is also sensitive to modification of the mobile radio beacons, their position or other changes of the radio environment.

2) Dead-reckoning based on inertial measurements and map based corrections. The basic principle of dead-reckoning is to integrate speed and heading changes to a global heading and position. Since velocity and heading rate are subject to offsets and disturbances, the integrated position will quickly diverge from or "drift away" from the true position. An indoor map is then required to stabilize the solution to stay in a feasible set of indoor positions, and to provide feedback of the actual offset values. An advantage of dead-reckoning is that it is a general and well known principle requiring only sensors in the device and no infrastructure. The approach works well potentially in indoor environments with a limited number of alternatives to move (the map is informative). However, dead-reckoning requires more complex algorithms, where filtering is required. The approach works less well in open indoor areas, where there is little information in the map. Further, drifting of the position estimate is common.

These principles can be combined into one solution that potentially avoids all the aforementioned disadvantages, but such an approach still faces many hard challenges and still requires a complex algorithm.

Changes in heading are the most important information in the dead-reckoning approach, besides the indoor map itself. As an example, in an office building, it is often sufficient to keep track of the 90 degree turns and the distance in between the turns. Given a starting point and assuming fairly constant speed, it is then possible to figure out the path, which is a simple task for a human. Computers can do this inference systematically, by evaluating a large number of alternatives and then selecting the one that best fits the observed changes in heading. The question is how to compute the heading change based on available sensors in a user carried device. Many hand-held devices, such as for instance smart phones, have both gyroscopes and vector magnetometers that relate to heading.

The most natural alternative is to start with the vector magnetometer, since its standard use is as a compass sensor, i.e., a heading sensor. If the user carried device has a fixed orientation relative to the moving person or object, and if the person is walking upright without tilting or rotating the device, then changes in the heading are directly detected from changes in the compass heading provided by the magnetometer. However, many indoor environments have large and frequent magnetic disturbances that would trigger a lot of false heading changes. Also, one cannot assume that the device is in a constant orientation relative the person all the time.

Gyroscopes are normally used to measure angular rates, including heading changes which are the angular rate projected onto the horizontal plane. The projection requires that 3 the downward direction is known. This can be computed from a vector accelerometer. Now, the angular rate has a rather large offset in consumer grade sensors, on the order of degrees per second. This offset further drifts over time, and cannot be calibrated once for all. The offset in combination with uncertainty in downward direction gives a large drift 5 in heading that is not easily stabilized. All in all, gyroscopes are in themselves not well suited to detect heading changes, and are useless for heading determination. Moreover, changes in the orientation of the device relative its user can be falsely interpreted as a turn.

SUMMARY

In an embodiment of the disclosed principles, it is an object of the present invention to provide an improved solution that alleviates the mentioned drawbacks with present devices. Furthermore, it is an object to provide a method to combine the information from motion and direction sensors in such a way that disturbances and changes in the heading of the user carried device relative to the user can be detected.

According to a first aspect of the invention, this is achieved by a method for determining the change in heading of a user in an indoor environment, wherein the user has a user carried device and the user carried device is provided with a direction sensor and a movement sensor. The method comprises the steps of receiving rotational movement information from a motion sensor regarding rotational movement of the user carried device; determining a heading angle based on said motion information; receiving a first direction information from a direction sensor regarding the downward direction of the user carried device; receiving a second direction information from a direction sensor regarding the direction of the movement of the user carried device; detect an outlier in said first and second direction information; and compute a corrected angle of said angle by comparing said angle with said first and second direction information and by considering the outlier. Herein, the term "outlier" refers to an inertial or magnetic measurement that is useless for localization due to a disturbance, and which, if used, would imply an incorrect turn in the odometric model.

The rotational movement of the user carried device may be measured as an angular rate. The downward direction, as sensed by a direction sensor, may be measured and used to determine the vertical angular rate in the horizontal plan. By using an integrator the vertical angular rate can be integrated to a heading angle. Since the angular rate may include an offset value, the integrated angle may unfortunately drift over time. The idea in the present invention is to use a filter that corrects the integrator by comparing the integrated angle with direction information sensed by another type of sensor. An advantage with this approach is that the two signals are sensed by two independent sensors, which are based on different measurement technology. A further advantage is that the two sensors measure different and independent magnitudes, since the second direction sensor may measure the angle whereas the rotational movement sensor measures the angular rate. Disturbances may influence these two sensors in different manner and at different occasions. That is, a disturbance in the rotational motion sensor may not appear in the direction sensor and the integrated angle may be corrected under knowledge of the information received from the direction sensor. A further advantage of this idea is that the downward direction information may be received from a third independent sensor sensitive to a third kind of disturbance and may thereby be able to correct the information of the other two sensors.

In the case when disturbances are present in any of the direction sensor measurement the correction filter may be disabled in order to not erroneously correct the integrated angle. One embodiment of the present invention includes an outlier rejection algorithm that disables the filter whenever one or both of the direction measurements deviates more than expected from the integrated angle.

A further idea of the present invention comprises an optional step of hypothesis testing if a change in the heading direction angle from one time to another is consistent with a change in heading, or if the change in angle comes from a change in orientation of the device relative the user.

According to a second aspect of the invention, a user carried device for determining the change in heading of a user in an indoor environment is provided, wherein the user carried device is provided with a direction sensor and a movement sensor. The movement sensor is adapted to provide rotational movement information regarding rotational movement of the user carried device. A first direction sensor is adapted to provide downward direction regarding the downward direction of the user carried device and a second direction sensor is adapted to provide heading information regarding the direction of the movement of the user carried device. The user carried device comprises a calculation unit that is adapted to determine an angle based on said rotational motion information; detect an outlier in said first and second direction sensors; and compute a corrected angle of said angle by comparing said heading angle with said first and second direction information and by considering the outlier.

In one embodiment, the rotational movement sensor may comprise a gyroscope. In another embodiment the downward direction sensor may comprise an accelerometer. If the accelerometer measures the acceleration in at least three directions it may be able to measure the direction of the gravitational field and the downward direction may be derived based on this information. The outlier rejection algorithm may be used to remove movements, sensed as accelerations, of the user carried device that influence the estimated downward direction.

In a further embodiment the heading direction sensor may comprise a magnetometer. The outlier rejection algorithm may be used to remove magnetic indoor disturbances from the compass heading.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
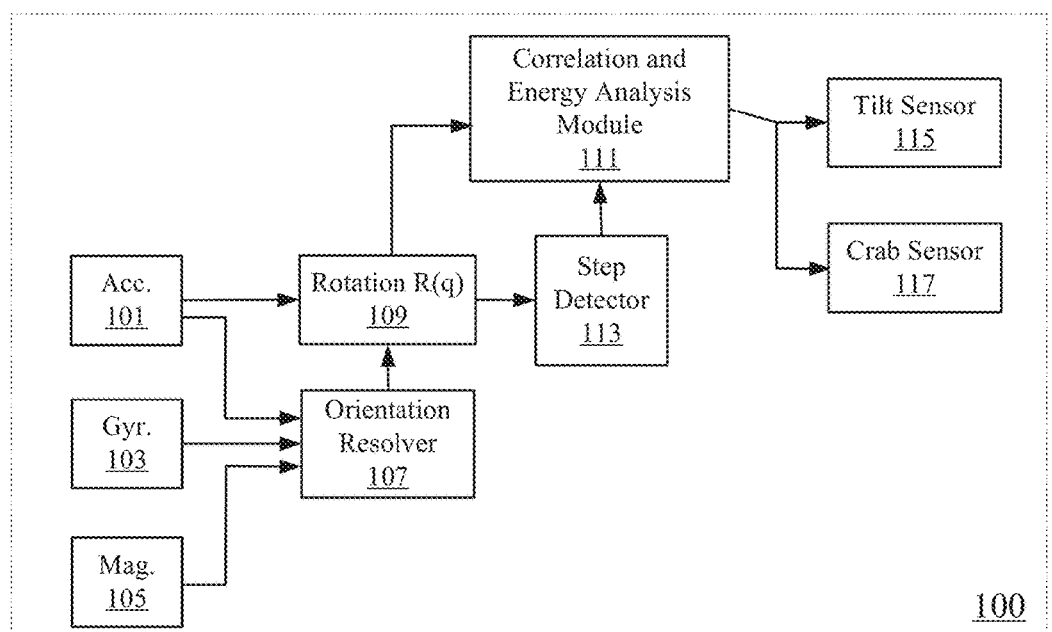
FIG. 1 shows a module-level schematic of a system in accordance with an embodiment of the disclosed principles.
Figure 2:
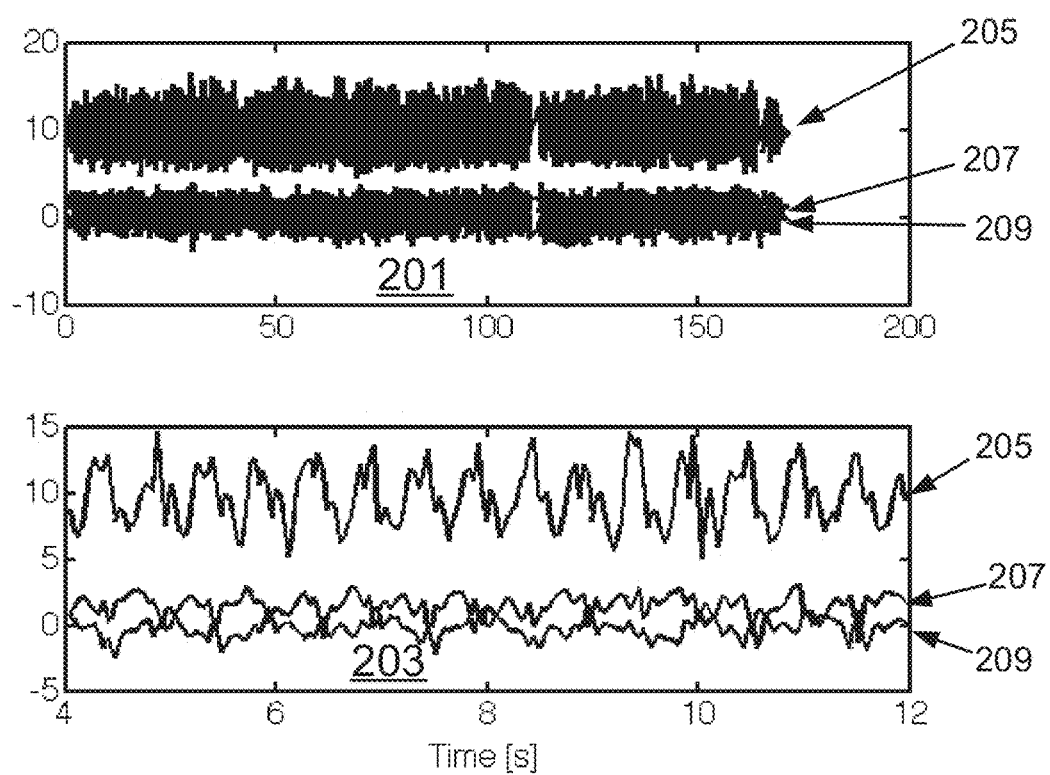
FIG. 2 shows a set of data plots associated with data in accordance with an embodiment of the disclosed principles.
Figure 3:
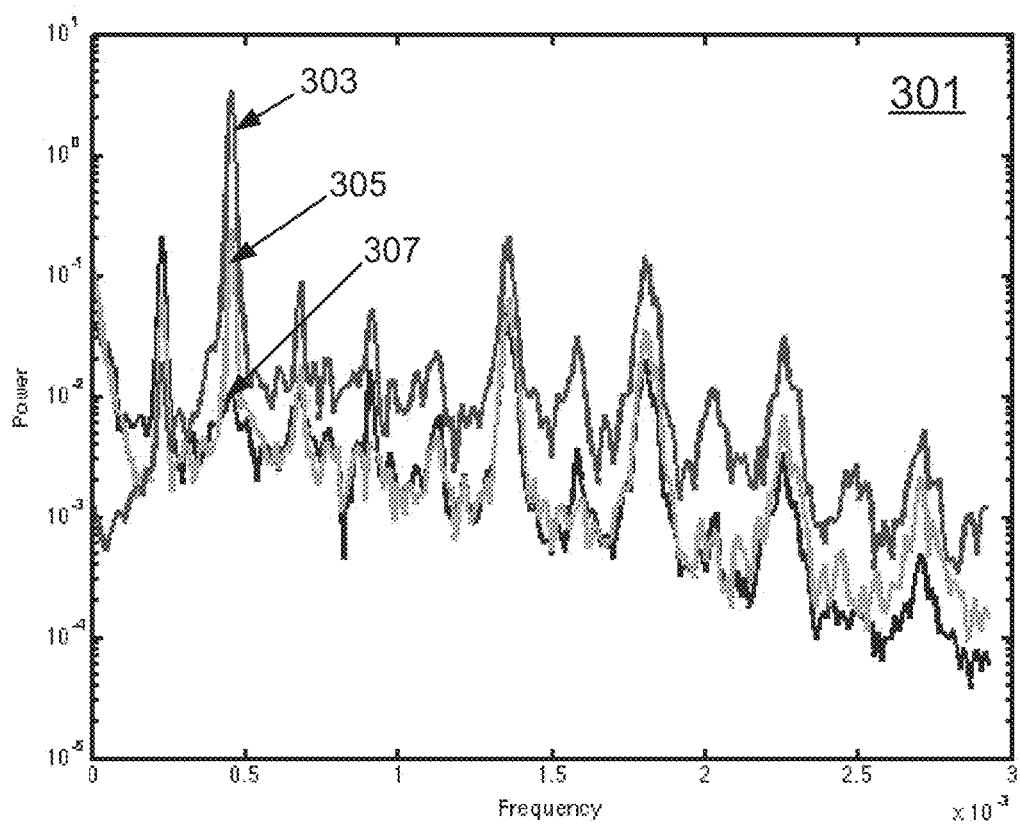
FIG. 3 shows a further set of data plots associated with data in accordance with an embodiment of the disclosed principles.
Figure 4:
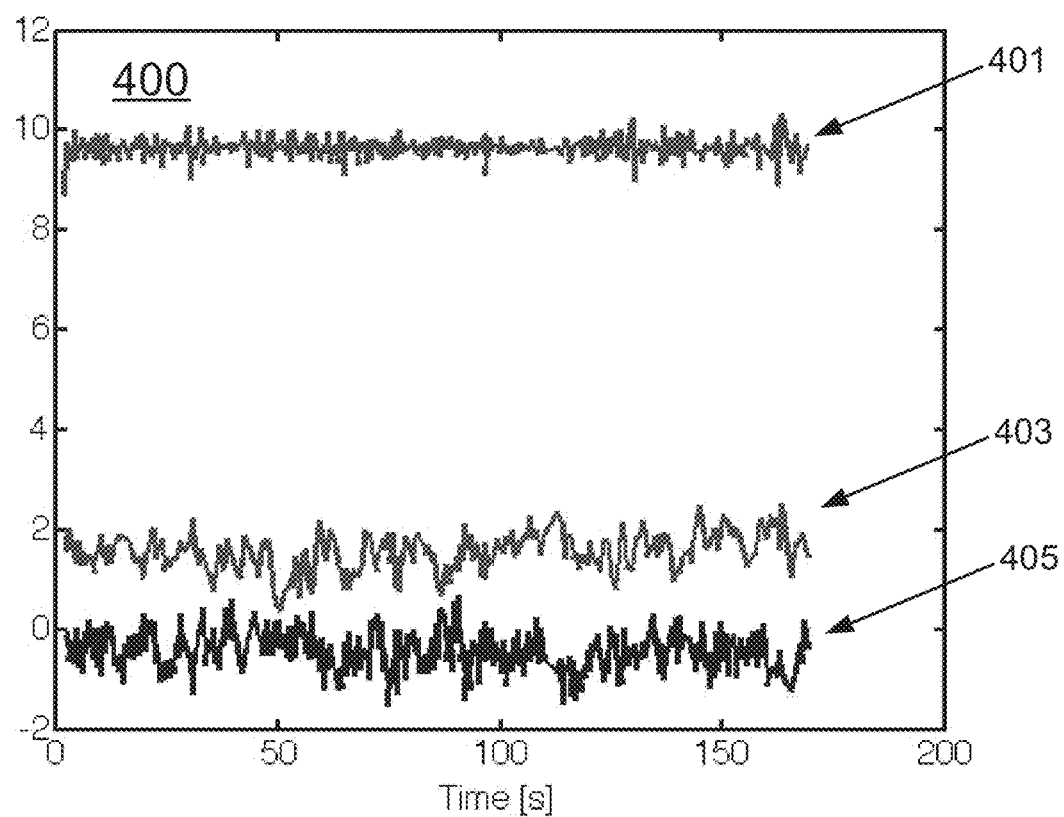
FIG. 4 shows a further set of data plots associated with data in accordance with an embodiment of the disclosed principles.
Figure 5:
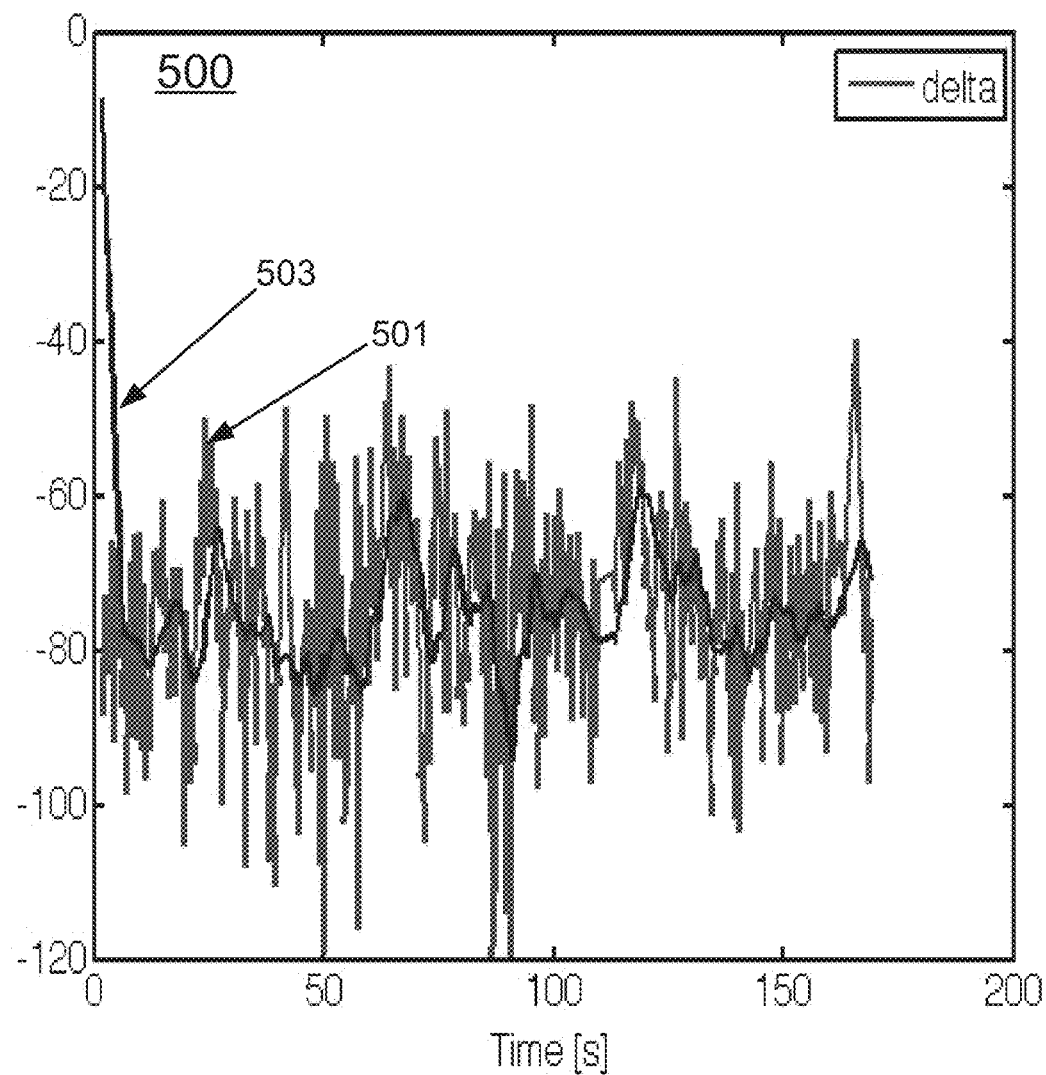
FIG. 5 shows a further set of data plots associated with data in accordance with an embodiment of the disclosed principles.
Figure 6:
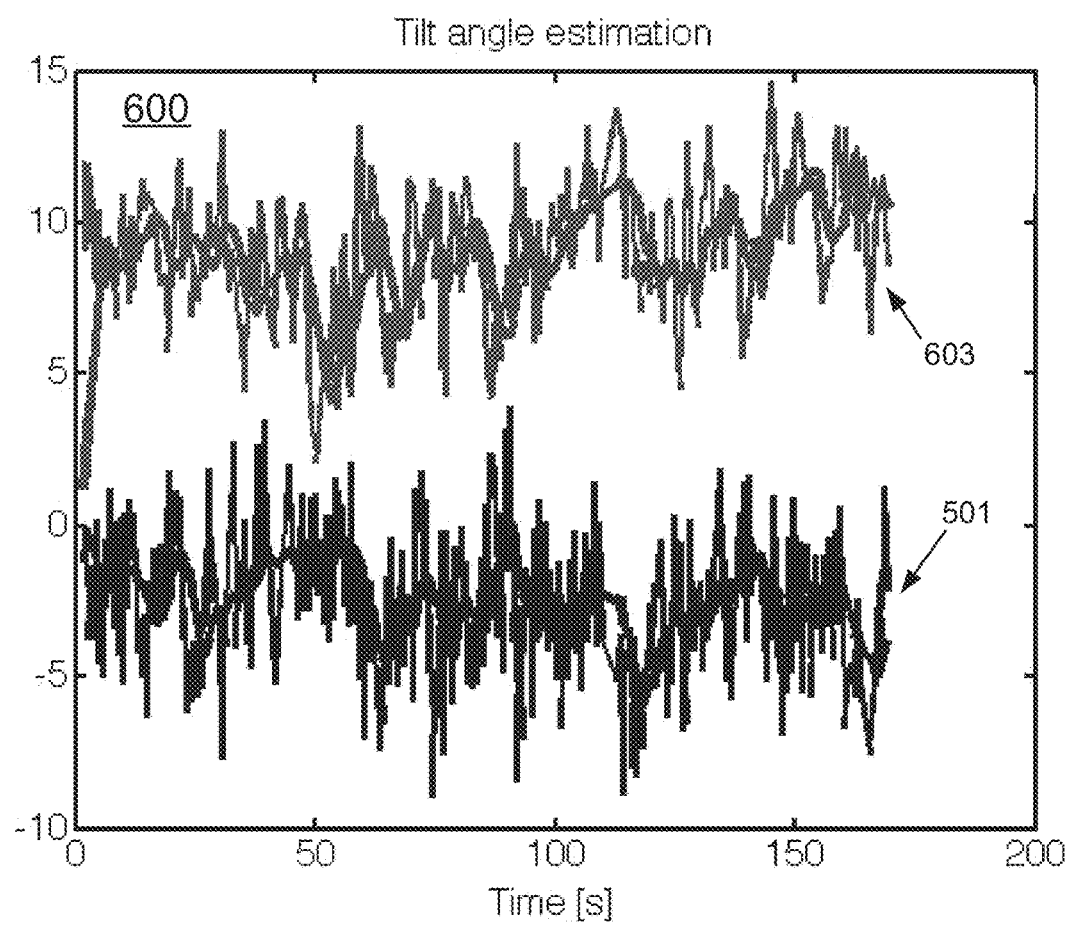
FIG. 6 shows a further set of data plots associated with data in accordance with an embodiment of the disclosed principles.
Figure 7:
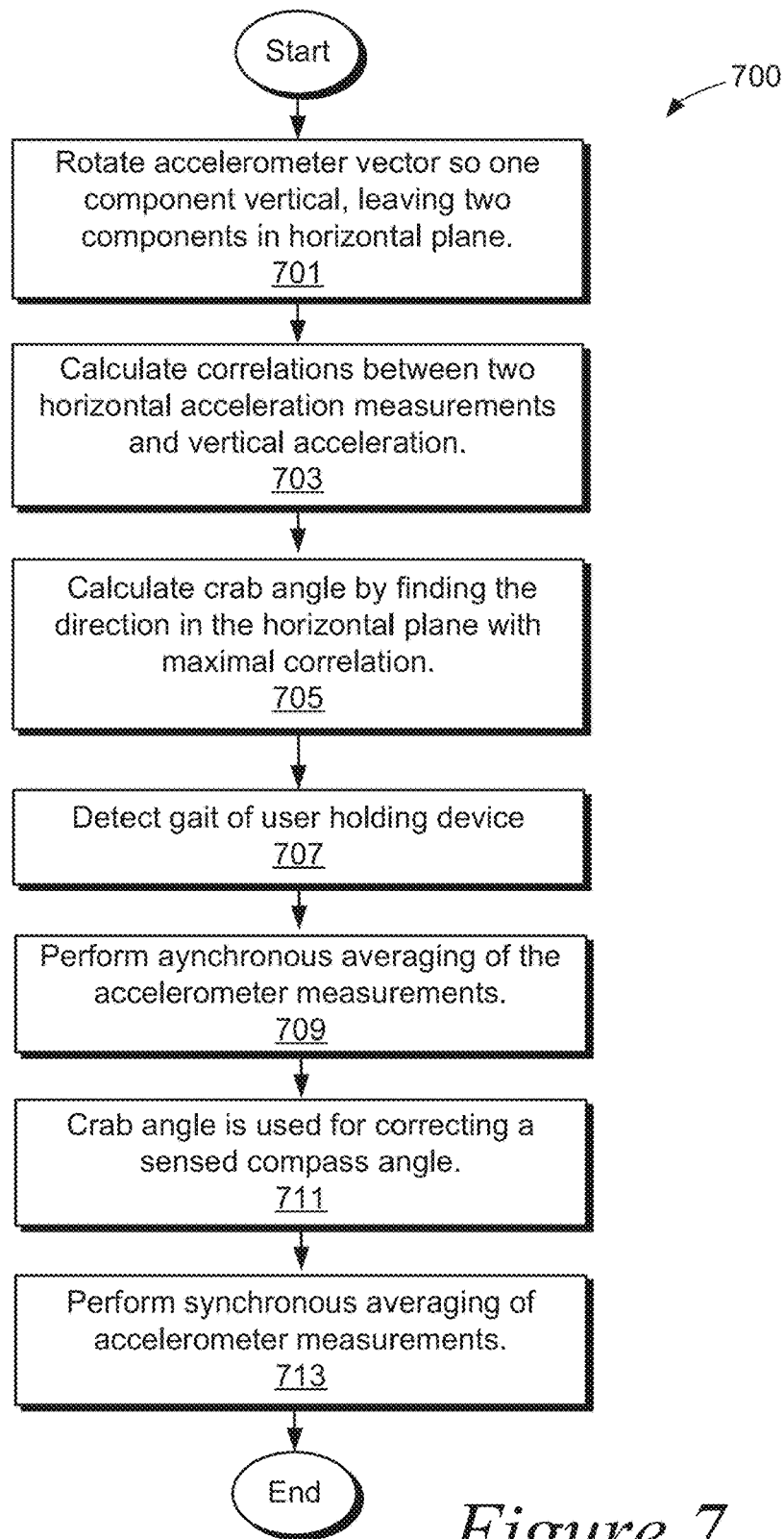
FIG. 7 shows a flow chart of indoor navigation in accordance with an embodiment of the disclosed principles.

The present invention will be described more fully hereinafter with reference to the accompanying drawing, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawing, like numbers refer to like elements.

There are three coordinate systems to consider: The orientation of the user carried device q, the coordinate system of the reference map, which can be assumed to be a world reference system (A vector in the device coordinate system is rotated to reference coordinate system by the rotation matrix R(q)), and the body orientation of the user relative to the map, and most importantly the heading $\psi$ and heading rate $\dot\psi$ defining in what direction the user is moving relative the reference map.

The device in one embodiment includes the following inertial and magnetic sensors:

Gyroscopes (103) providing turn rate $\omega$, but measured with an offset $b^\omega_k$ and noise $e^\omega_k$ to yield $y^\omega_k = \omega_k + b^\omega_k + e^\omega_k$. Accelerometers (101) providing gravity g in the device coordinate system, but measured with an offset $b^a_k$ and disturbance $d^a_k$ (the linear acceleration a of the device) and noise $e^a_k$ to yield $y^a_k = R(q_k)g + b^a_k + d^a_k + e^a_k$.

Magnetometers (105) providing the earth magnetic field m in the device coordinate system, but measured with a bias $b^m_k$ and disturbance $d^m_k$ (stemming from soft and hard iron in the environment) and noise $e^m_k$ to yield $y^m_k = R(q_k)m + b^m_k + d^m_k + e^m_k$. The earth magnetic field is here assumed to be a constant vector m, which might be known in advance or might be estimated in a separate calibration phase.

Secondary position sensors are also relevant for this invention, such as Bluetooth beacons or global navigation satellite systems (GNSS) providing a position fix (X(t), Y(t)) of high accuracy.

In summary, we have the raw measurements:

$$y^\omega_k = \omega_k + b^\omega_k + e^\omega_k$$

$$y^a_k = R(q_k)g + b^a_k + d^a_k + e^a_k$$

$$y^m_k = R(q_k)m + b^m_k + d^m_k + e^m_k$$

These sensors are representative for the key steps in this invention, but it should be noted that there are other sensors for measuring angle and angular rates of a device for indoor navigation.

In the horizontal plane, the heading defines the direction of motion of the device relative the reference map. The heading in the horizontal plane is defined as $\psi$, and correspondingly, the heading rate is defined as $\dot\psi$. A heading rate sensor can be provided by $\dot\psi = \omega_z$ from the gyro, given that the device is orientated horizontally all the time. With an inclination sensor measuring q, the heading rate can be computed as $\dot\psi = (1,0,0)R(q)\omega$. In this way, we have the basic form of a heading rate sensor.

One way to compute the heading rate directly is based on the dot product of the gyro and accelerometer, $$\dot\psi = \frac{\|\omega \cdot a\|}{g} \qquad (4)$$

This model illustrates the main problems of using the gyro as a heading rate sensor. More advanced ways to utilize the gyro will be described later. If we replace the theoretical values of gravitational acceleration and rotational rates using (1) and (2), then we approximate the total effects of bias, disturbance and noise as $$y^{\dot\psi}_k = \dot\psi_k + b^{\dot\psi}_k + e^{\dot\psi}_k. \qquad (5)$$

The point is that we replace the three-dimensional errors of two sensors with one dimensional error of each kind (offset, disturbance, measurement error). This is sufficient for horizontal positioning, and substantially decreases the complexity of the problem. Normally, the set of all offsets is not even identifiable.

Similarly, the heading of the device can be computed from the magnetometer using a cross product (for simplicity, assuming an horizontal device with $\theta = \phi = 0$ more advanced models to follow)

$$v = a \times m = \qquad (6)$$

$$\begin{pmatrix} \cos(\psi) & \sin(\psi) & 0 \\ \sin(\psi) & -\cos(\psi) & 0 \\ 0 & 0 & 1 \end{pmatrix} \begin{pmatrix} 0 \\ \cos(\delta)m \\ -\sin(\delta)m \end{pmatrix} \times \begin{pmatrix} 0 \\ 0 \\ g \end{pmatrix} = gm\cos(\delta) \begin{pmatrix} \cos(\psi) \\ \sin(\psi) \\ 0 \end{pmatrix},$$

$$\psi = \operatorname{atan}(v_2/v_1). \qquad (7)$$

Here, m is the magnitude of the earth magnetic field and $\delta$ is dip angle (angle to horizontal plane). Both are location-dependent, but their influence will be cancelled out when solving the right hand side above for the heading $\psi$.

Once again, if we replace the theoretical values of gravitational acceleration and magnetic field with the observed values (1) and (3), then we approximate the total effects of bias, disturbance and noise as $$y^\psi_k = \psi_k + b^\psi_k + e^\psi_k. \qquad (8)$$

Thus, the inertial sensors provide the following heading related information, which can be seen as virtual sensors of heading rate and heading:

$$y^{\dot\psi}_k = \dot\psi_k + b^{\dot\psi}_k + d^{(1)}_k + e^{\dot\psi}_k \qquad (9)$$

$$y^\psi_k = \psi_k + b^\psi_k + d^{(2)}_k + e^\psi_k \qquad (10)$$

The first disturbance $d^{(1)}_k$ is mainly due to an acceleration that causes the accelerometer to measure linear acceleration besides gravitation. The second disturbance $d^{(2)}_k$ is mainly due to a magnetic disturbance that comes and goes. The two offsets $b_k$ are caused by all of the involved offsets (nine in total). These offsets are slowly varying over time, and can during short time horizons be seen as a constant.

A Horizontal Motion Model

Denoting the horizontal position at time t with (X(t), Y(t)), one embodiment of dead reckoning model based on the state vector $x = (X, Y, \psi, \dot\psi, L, b^\psi, b^{\dot\psi})$ is as follows:

$$X(t+1) = (t) + L(t)\cos(\psi(t)), \qquad (11)$$

$$Y(t+1) = Y(t) + L(t)\sin(\psi(t)), \qquad (12)$$

$$\psi(t+1) = \psi(t) + T(t)\dot\psi(t), \qquad (13)$$

$$\dot\psi(t+1) = \dot\psi(t) + T(t)w^{\dot\psi}(t), \qquad (14)$$

$$L(t+1) = L(t) + w_L(t), \qquad (15)$$

$$b^{\dot\psi}(t+1) = b^{\dot\psi}(t) + w^{b,\dot\psi}(t), \qquad (16)$$

$$b^\psi(t+1) = b^\psi(t) + w^{b,\psi}(t), \qquad (17)$$

Here, the offsets are assumed to be slowly time-varying according to a random walk. The heading is assumed to be double integrated white noise, and the speed L(t) is integrated white noise. The position is dead-reckoned from heading and speed. The sampling rate can be time-varying, and T(t) denotes the sample interval at time t. In one embodiment, t denotes the number of steps taken, L(t) is the step length and T(t) the step interval.

The point with this selection of states is that the measurements in (9) and (10) are now (linear) functions of the state. Similarly, position related measurements as provided by GNSS, radio beacons or proximity sensors are also (linear) functions of the state. In total, the framework fits a standard filtering application, where the extended or unscented Kalman filter, point-mass or particle filters, can be applied. It will be appreciated that other suitable algorithms may be used instead if desired.

The horizontal motion model (11)-(17) constitutes one instance of a pedestrian odometric model with the purpose of dead-reckoning inertial sensor information into a trajectory. This pedestrian trajectory can be used to monitor the correctness or plausibility of the sensor information. If one of the inertial sensors gives contradictory information or information that results in improbable trajectories, it can be deemed to be an outlier. The odomeric model is thus one instrument for detecting outliers in the measurements.

Moreover, building information models (BIM) can be used to define feasible pedestrian trajectories that follow corridors and doors, without crossing walls and other obstacles. BIM is thus a further tool to monitor the measurements and another instrument that can be used to detect outliers.

Building information models can also be handled in the filter framework described above, for instance as constraints on passable areas in the horizontal plane.

One key point is that supporting information from BIM and position sensors will assist in tracking the offsets and in this way improve the dead-reckoning in intervals with no such information.

Outlier Rejection of Bad Measurements.

The virtual sensors in (9) and (10) can both be either reliable or unreliable, depending on the disturbance. This can be phrased as a hypothesis test for each virtual sensor i:

$$H^{(i)}_0 : d^{(i)}_k = 0, \quad (18)$$

$$H^{(i)}_1 : d^{(i)}_k \neq 0. \quad (19)$$

To decide if a virtual sensor is reliable at the same time as getting a robust estimate of heading, a filter approach can be done. In a straightforward embodiment, a Kalman filter can be used as follows.

The hypothesis test in (18) can be implemented using the following tests:

$$|y^{(1)}_k - \hat{\psi}_k| < h^{(1)}, \quad (20)$$

$$|y^{(2)}_k - \dot{\hat{\psi}}_k - \hat{b}_k| < h^{(2)}, \quad (21)$$

$$(22)$$

It should be noted that there are many ways to state this and similar tests, for instance by weighting the test statistics with the inverse covariance from the Kalman filter. In an IPS, some of the disturbances can be reoccurring at the same position for all users. This is true for magnetic disturbances, for instance. The device may therefore report the existence and size of the disturbance to a database. This allows for crowd-sourcing of magnetic field disturbances that can be added to the IPS BIM model.

Three-Dimensional Orientation Models

The exemplary and illustrative computations leading to (9) can be extended to more advanced three-dimensional navigation models. Here, the rotational dynamics can be stated as a dynamical system using the rotation vector q (Euler angles, quaternions or any other representation deemed useful) and angular rate vector ω using the state vector $x(t) = (q^T(t), \omega^T(t), b^\omega(t), m(t))^T$. Here, gyro bias and magnetic field are also included in the state vector.

The continuous time dynamics for this state vector are given by:

$$\dot{q}(t) = S(q(t))\omega(t), \quad (23)$$

$$\dot{\omega}(t) = v^\omega(t), \quad (24)$$

$$\dot{b}^\omega(t) = v^b(t), \quad (25)$$

$$\dot{m}(t) = v^m(t), \quad (26)$$

where $v^i(t)$, $i \in \{\omega, b, m\}$ are stochastic processes modeling the change in angular rate, gyro bias and magnetic field, respectively. Here, $q = q(t)$ is a continuous time angle, while $q_k$ is the value at a sampling time $t_k$, indexed by k.

In this 3D case, there is also an option to eliminate the angular rate from the state vector, and the complete model becomes:

$$\dot{q}(t) = S(q(t))(y^\omega(t) - b^\omega(t) - e^\omega(t)) \quad (27)$$

$$y^a_k = R(q_k)g + b^a_k + d^a_k + e^a_k \quad (28)$$

$$y^m_k = R(q_k)m + b^m_k + d^m_k + e^m_k \quad (29)$$

Here, $d^{(i)}_k$ for $i \in \{m, a\}$ is a possible disturbance on magnetometer (m) and accelerometer (a), respectively, and $e^{(i)}_k$ denotes their measurement noise.

Just as in the 2D case, we can first include the offset values b in the state vector and learn these on the fly, and second we can pose the problem with disturbances as a hypothesis test, this time directly on the magnetometer and accelerometer ($i \in \{a, m\}$):

$$H^{(i)}_0 : d^{(i)}_k = 0, \quad (33)$$

$$H^{(i)}_1 : d^{(i)}_k \neq 0. \quad (34)$$

A simple hypothesis test is to accept the magnetometer measurement if $$\|y^m_k - R(\hat{q}_k)\hat{m}_k\| < h^m \quad (35)$$

and for the accelerometer $$\|y^a_k - R(\hat{q}_k)g\| < h^a \quad (36)$$

The described embodiments illustrated in 2D and 3D fit into a general nonlinear filtering framework where the state vector is $x = (q^T\ b^{\omega,T}\ m^T)^T$. It is also a standard problem to detect the disturbances in the measurements $y_k$ by outlier detection algorithms, and in such case exclude such outliers from the filter operation.

The result is a nonlinear filter that provides the orientation q of the device even during short time accelerations and passages of magnetic field disturbances. The time update in the nonlinear filter involves simulation of the dynamic model from one measurement time to the next one. The model in Equation (30) above is given in continuous time, and can in a standard way be discretized by integrating the measured turn rate. This is preferably done as fast as possible to avoid discretization effects.

The measurements arrive at a high sampling rate. Since the movement of the user is rather periodic, much can be gained by averaging the accelerometer and magnetometer signals over one complete cycle. The motion pattern would then ideally integrate to zero when moving with constant speed straightforward, and the two disturbances would naturally be zero. This approach requires that the period time of the motion pattern is known, which requires an external input. Here, a standard step detection algorithm can be used.

In one embodiment, the particle filter is used as a nonlinear filter. It has many nice features for indoor navigation. The disturbances we anticipate in Equations (1-3) that we want to detect can be summarized as follows:

The disturbance $d^a_k$ is due to a linear acceleration of the device. This can be caused by user operation of the device, which implies problem to find the downward direction and the orientation q of the device.

The disturbance $d^m_k$ is due to hard and soft iron in the environment, that gives rise to a magnetic field that is superimposed on the earth magnetic field that is used to find that compass direction.

What we mean by outlier is thus a disturbance, including the ones above, that would be falsely interpreted as motion-related if not detected and treated appropriately in the IPS.

An outlier can also be caused in the sensor itself, rather than by the user or the environment.

For instance, it can handle the nonlinear rotation operations without approximation, and it can evaluate a large number of hypotheses on the trajectory in real-time on standard devices. For this approach, it adds the benefit of soft decisions. That is, normally an outlier rejection test or hypothesis test leads to a hard decision that is fed back to the filter. An incorrect decision will then lead to a decision feedback problem that may cause divergence in the filter. The feature of having a large number of independent hypotheses in the particle filter enables soft decisions.

While there are other application scenarios for the illustrated system and process, this document will not attempt to catalog all such uses. Those of skill in the art will appreciate that there are many possible embodiments to which the principles of the present disclosure may be applied. The embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for determining a heading angle of a portable electronic device in an indoor environment comprising:
   providing an orientation model describing how rotational movement is integrated to orientation;
   receiving rotational movement information from a rotational sensor of the portable electronic device, the rotational movement information being indicative of rotational movement of the portable electronic device;
   determining a first heading angle of the portable electronic device at the processor based on the received rotational movement information and the orientation model and then computing the orientation around the downward direction of the portable electronic device to form the first heading angle;
   receiving first direction information from a first direction sensor of the portable electronic device;
   receiving second direction information from a second direction sensor, wherein the second direction information is indicative of a direction of movement of the portable electronic device;
   using the processor of the portable electronic device, identifying an outlier that is one of said first and second direction information, the outlier comprising information that is inaccurate due to an occurrence of a disturbance; and
   computing a correction to the heading angle at the processor of the portable electronic device by comparing the heading angle to the first and second direction information and considering the outlier.

2. The method in accordance with claim 1 wherein detecting the outlier comprises applying an odometric model to identify the outlier.

3. The method in accordance with claim 2 wherein detecting the outlier further comprises applying a building information model (BIM) to the result of the applying the odometric model to identify physically impossible movements as outliers, wherein the BIM includes information relating to building structures.

4. The method in accordance with claim 1 wherein the rotational movement information comprises angular rate information from a gyroscopic sensor.

5. The method in accordance with claim 4 wherein the outlier arises from the angular rate information from the gyroscopic sensor and is due to a change in orientation of the device in relation to the user rather than a change in a heading of the user.

6. The method in accordance with claim 1 wherein receiving first direction information from a direction sensor of the portable electronic device comprises receiving the first direction information from an accelerometer.

7. The method in accordance with claim 6 wherein the outlier arises from an acceleration of the device.

8. The method in accordance with claim 1 wherein receiving the second direction information comprises receiving information from a magnetometer.

9. The method in accordance with claim 8 wherein the outlier is due to a magnetic field in the device environment that is superimposed on the earth magnetic field.

10. The method in accordance with claim 9 further comprising reporting the outlier due to the device environment.

11. The method in accordance with claim 10 wherein reporting the outlier comprises notifying a remote entity of the outlier and device position information when the outlier is detected.

12. The method in accordance with claim 11 wherein the remote entity is a crowd-sourced database.

13. A portable electronic device configured to determine a heading angle of the device in an indoor environment, the device comprising:
    a gyroscopic sensor configured to detect rotational movement of the device;
    a first direction sensor;
    a second direction sensor; and
    a controller configured to receive rotational movement information from the gyroscopic sensor, determine at the controller a first heading angle of the portable electronic device based on the received rotational movement information by using a sensed downward direction to determine the vertical angular rate in the horizontal plane, and integrating the vertical angular rate to form the first heading angle, receive first direction information from the first direction sensor and second direction information from the second direction sensor, identify an outlier that is one of the first direction information and second direction information, the outlier comprising information that is inaccurate due to an occurrence of a disturbance, and compute a correction to the heading angle by comparing the heading angle to the first and second direction information and considering the outlier.

14. The portable electronic device in accordance with claim 13 wherein the first direction sensor comprises at least one accelerometer.

15. The portable electronic device in accordance with claim 13 wherein the second direction sensor comprises at least one magnetometer.

16. The portable electronic device in accordance with claim 13 wherein the outlier is due to a magnetic field in the device environment that is superimposed on the earth magnetic field.

17. The portable electronic device in accordance with claim 13 wherein the outlier arises from an acceleration of the device.

18. The portable electronic device in accordance with claim 13 wherein the controller is further configured to detect the outlier by applying an odometric model.

19. The portable electronic device in accordance with claim 13 wherein the controller is further configured to detect the outlier by applying a building information model (BIM) to the result of the odometric model to identify a physically impossible movement as an outliers, wherein the BIM includes information relating to building structures.

* * * * *